(12) United States Patent
Mandai et al.

(10) Patent No.: US 6,250,065 B1
(45) Date of Patent: Jun. 26, 2001

(54) GAS TURBINE COMBUSTION SYSTEM AND COMBUSTOR IGNITION METHOD THEREFOR

(75) Inventors: Shigemi Mandai; Tetsuo Gora; Koichi Nishida; Masataka Ota; Ichiro Fukue; Shinji Akamatsu; Satoshi Tanimura; Hideki Haruta; Tomohisa Takasaki, all of Takasago; Teruya Tachibana, Hiroshima, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/292,385

(22) Filed: Apr. 15, 1999

(30) Foreign Application Priority Data

| Apr. 21, 1998 | (JP) | .................................... | 10-110701 |
| Jun. 8, 1998 | (JP) | .................................... | 10-159183 |
| Jul. 7, 1998 | (JP) | .................................... | 10-191303 |

(51) Int. Cl.$^7$ ..................................... F02B 3/00
(52) U.S. Cl. ................... 60/39.06; 60/39.094; 60/39.53; 60/39.58; 60/39.59; 60/39.18
(58) Field of Search .............................. 60/39.06, 39.094, 60/39.53, 39.58, 39.59, 39.18

(56) References Cited

U.S. PATENT DOCUMENTS

| 2,604,510 | * | 7/1952 | Berkey ................................. 175/115 |
| 4,271,664 | * | 6/1981 | Earnest ................................ 60/39.18 |
| 5,720,164 | * | 2/1998 | Corbett et al. ....................... 60/39.53 |

FOREIGN PATENT DOCUMENTS

| 4-279733 | 10/1992 | (JP) . |
| 7-034900 | 2/1995 | (JP) . |
| 7-305848 | 11/1995 | (JP) . |

* cited by examiner

Primary Examiner—Timothy S. Thorpe
Assistant Examiner—Ed Hayes
(74) Attorney, Agent, or Firm—Wenderoth, Lind & Ponack, L.L.P.

(57) ABSTRACT

Liquid fuel purge device uses water, not compressed air as in the prior art, thereby prevented are rapid load change of gas turbine due to sudden discharge of liquid fuel and coking of remaining liquid fuel. Upon supply of liquid fuel to fuel nozzle (05) being stopped, water purge system (15) having stop valve (16) supplies water into fuel system including liquid fuel system (08) and fuel nozzle (05) and liquid fuel remaining therein is purged by water into combustion chamber (013) from the fuel nozzle (05).

9 Claims, 6 Drawing Sheets

GAS TURBINE COMBUSTION SYSTEM AND COMBUSTOR IGNITION METHOD THEREFOR

BACKGROUND OF THE INVENTION

1. Field of the Invention

The present invention relates generally to a gas turbine combustion system and a combustor ignition method therefor and more specifically to a gas turbine combustion system including a liquid fuel purge device and an ignition plug unit, a combustion ignition method therefor and a diffusion combustion type gas turbine combustion system.

2. Description of the Prior Art

As a prior art, there is used a combustor made such that a pilot nozzle is provided in a central portion of an inner cylinder of which end portion is open toward a gas turbine combustion chamber, a plurality of main nozzles are provided along a circumference surrounding the pilot nozzle and fuel supply rate to the plurality of main nozzles is regulated corresponding to change in the load of gas turbine so that the combustor is operated corresponding to size of load. It is to be noted that the term "fuel nozzle" as used herein is defined to include the main nozzles and the pilot nozzle.

For example, in the combustor of gas turbine used for power generation, fuel supply rate to the main nozzles is reduced or all the fuel nozzles including the pilot nozzle are extinguished to be stopped in the night time or the like time when the power demand is small. Also, in the day time or the like time when the power demand is large, diffusion flames are first generated by the pilot nozzle and then the main nozzles which had been extinguished and stopped are restarted to form active premixed flames. For this purpose, the main nozzles are regulated of the fuel supply rate so as to correspond to the size of load and are ignited for operation by the diffusion flames held in a flame holding cone provided in front of the pilot nozzle, so that the combustor is operated corresponding to the load.

Further, there is also used such one of the mentioned combustor as having same one fuel supply system constructed such that a liquid fuel and a gas fuel, both being usable therein, are supplied into the fuel nozzles according to the time by changing over the fuel, for example, from liquid fuel to gas fuel, during the operation.

FIG. 5 is a schematic view showing a combustor and a fuel system therefor in the prior art used for operation of a gas turbine. In this figure, a combustor 01 comprises; an inner cylinder 02 provided to a side wall of a combustion chamber 013 and having its front portion opening toward the combustion chamber 013; a fuel nozzle 05 consisting of a pilot nozzle 04 provided in a central portion within the inner cylinder 02 and a plurality of main nozzles 03 provided on a coaxial circumference surrounding the pilot nozzle 04; and a flame holding cone 012 provided in front of the pilot nozzle 04 for holding combustion of diffusion flames generated by the pilot nozzle 04.

Also, a liquid fuel system 08 comprises a main liquid fuel system 07 for supplying liquid fuel to the plurality of main nozzles 03 and a pilot liquid fuel system 06 for supplying the liquid fuel to the pilot nozzle 04.

Further, if the combustor 01 is made in a dual fuel type, that is, if the fuel nozzle 05 is so made that either liquid fuel or gas fuel is usable, the liquid fuel system 08 comprising the pilot liquid fuel system 06 and the main liquid fuel system 07 can supply not only the liquid fuel but also the gas fuel to the fuel nozzle 05 when the gas fuel is to be burned by the fuel nozzle 05. Also, in each of the liquid fuel system 08, that is, in each of the pilot liquid fuel system 06 and the main liquid fuel system 07, there is interposed a stop valve 09 for intercepting fuel supply to the fuel nozzle 05. It is to be noted that the term "fuel system" as used herein is defined to include the liquid fuel system and the fuel nozzle.

To each of the liquid fuel system 08 between the stop valve 09 and the fuel nozzle 05, there is connected an air purge system 010 having a stop valve 011 interposed therein, so that a fuel purge device is constituted thereby.

In this fuel purge device comprising the air purge system 010 and the stop valve 011, in case the combustor 01 is a dual fuel type combustor 01 for example, when gas turbine is to be stopped after liquid fuel has been used therefor, or when liquid fuel is to be changed to gas fuel while operation is being done using the liquid fuel, the stop valve 011 is opened and compressed air is thereupon supplied from the air purge system 010 into each of the liquid fuel system 08 between the stop valve 09 and the fuel nozzle 05 so that the liquid fuel remaining in said portion of the liquid fuel system 08 and in the fuel nozzle 05 is air-purged and is discharged into the combustion chamber 013.

However, in the prior art fuel purge device so supplying the compressed air to effect the air purge of the fuel remaining in the fuel system including the liquid fuel system 08 and the fuel nozzle 05, when the compressed air is injected into the fuel system, the liquid fuel remaining therein is discharged from the fuel nozzle 05 into the combustion chamber 013 suddenly by the effect of the compressed air so that there is a possibility of causing a sudden change of load.

Also, because of the purging using air which is lighter than the liquid fuel, there may be such a case where the remaining liquid fuel is not completely discharged but remains in the fuel system so that coking of the liquid fuel occurs due to high temperature of the surrounding area, which results in a problem of high possibility of causing a blockage of fuel passages in the fuel system including the liquid fuel system 08 and the fuel nozzle 05.

In FIG. 6, there is provided an ignition plug unit in the downstream area of said fuel nozzle 05. In this figure, an ignition plug 6 has a piston 8 provided to its back side portion and is constructed to be protrusile and retractile into and from within a combustor wall 1 by effect of air pressure acting on the piston 8 and elastic force of an elastic spring 7 resisting thereagainst so that it is protruded into within the combustor wall 1 only when the ignition is to be done, as shown by position B in FIG. 6.

On the other hand, a combustor in the upstream area of the position B within the combustor wall 1 is constructed such that fuel is supplied thereinto from a pilot nozzle 4 provided on a central axis of the combustor and from main nozzles 2 provided around the pilot nozzle 4 and air as combustion supporting gas is supplied through a pilot swirler 5 and main swirlers 3 provided around said respective nozzles so that the fuel and the air may be mixed and atomized.

In the combustor and the ignition plug unit so constructed, pressurized air from an air source 10 passes through a three way valve 9 and pushes the piston 8 provided to the back side of the ignition plug 6 against the elastic spring 7, thereby the ignition plug 6 is protruded through the combustor wall 1 to the position B from position A. On the other hand, the fuel and the air from the pilot nozzle 4 and the pilot swirler 5, respectively, are pilot-atomized and ignited by ignition spark from tip end of the ignition plug 6. Upon the ignition being so done, the air which had been supplied to the piston 8 via the three way valve 9 is drawn by the three way valve 9 being changed over and the ignition plug 6 is retracted quickly to the original position A from within the combustor wall 1 by the elastic force of the spring 7. Such protrusion and retraction of the ignition plug 6 are done instantaneously and the ignition spark is given only when the ignition plug 6 is in the position B.

If the combustor is of a dual fuel type in which both of gas and oil fuels are usable, there is a case where the position of the ignition plug tip which is optimal for the ignition is different between the gas fuel and the oil fuel. In this case, if the prior art ignition plug shown in FIG. 6 is used, there arises a problem where either one of these fuels may not be ignited.

FIG. 7 is a diagrammatic view showing an entire system of a prior art diffusion combustion type gas turbine which comprises a combustor having therein said fuel purge device, ignition plug, etc. sequentially from the upstream side. Numeral 21 designates a compressor, which is connected to a turbine 23 for mechanical drive via a rotational shaft (not shown) and has its upstream end communicating with an intake air passage 24. Numeral 22 designates a combustor, which has its upstream end communicating with an outlet portion of a downstream end of the compressor 21 and with a fuel passage 26 and also has its downstream end communicating with the turbine 23.

The turbine 23 communicates on its upstream side with the combustor 22, as mentioned above, and on its downstream side with an atmospheric discharge device of a stack and the like (not shown) or, according to a type of system, with a heat recovery device of a waste heat recovery boiler and the like (not shown), via an exhaust passage 25.

In take air from the intake air passage 24 is compressed by the compressor 21 to be mixed with fuel from the fuel passage 26 for combustion and resultant combustion gas is expanded at the turbine 23 for work at a generator and the like (not shown).

In the combustor of what is called a diffusion combustion type gas turbine shown in FIG. 7 into which fuel and air are supplied separately for combustion, there is an advantage that the combustor can be made less expensively as compared with a low NOx combustor of a premixing type which is generally compared with said diffusion combustion type and moreover the combustion is easily stabilized.

However, in the diffusion combustion type on one side, there occurs an area where the flame temperature becomes high due to diffusion of combustion and problem arises that NOx concentration becomes high.

SUMMARY OF THE INVENTION

In view of the mentioned problem in the prior art fuel purge device, it is an object of the present invention to provide a liquid fuel purge device in which, when a gas turbine operated by liquid fuel is stopped or when in a dual fuel type combustor, the liquid fuel is changed over to gas fuel, the liquid fuel remaining in a fuel system including a fuel nozzle and a liquid fuel system is purged into a combustor from the fuel nozzle and a sudden load change caused thereby is prevented and also the liquid fuel remaining in the fuel system is purged completely into the combustion chamber, thereby a blockage of fuel passages in the fuel system caused by coking etc. of the remaining liquid fuel is prevented completely.

It is also an object of the present invention to provide an ignition method and an ignition plug unit of a gas turbine combustor by which an optimal control of ignition can be done even in a case where the combustor is of a dual fuel type in which both gas and liquid fuels are usable.

It is also an object of the present invention to provide a gas turbine of a diffusion combustion type in which the disadvantage in the prior art as mentioned above is dissolved, a low NOx combustion is attained and still the original advantage of low cost of the diffusion combustion type is maintained as it is.

In order to attain said objects, the present invention mentioned in claim 1 provides following means;

A gas turbine combustion system comprising a combustor having therein a liquid fuel purge device constructed such that when a gas turbine operated by a liquid fuel is stopped or when in a gas turbine operated by a liquid fuel, the liquid fuel is changed over to a gas fuel, the liquid fuel remaining in a fuel system including a fuel nozzle and a liquid fuel system is purged into a combustion chamber, characterized in that said liquid fuel purge device is constructed such that said liquid fuel remaining in the fuel system is purged into the combustion chamber by water supplied into said fuel system.

According to the present invention, the liquid fuel is prevented from remaining in the fuel system, and further, even if the liquid fuel remaining in the fuel system is discharged suddenly into the combustion chamber from the fuel nozzle, as the liquid fuel so discharged is mixed with water to be of a weak combustibility or even of a non-combustibility, rapid combustion thereof is avoided and a large load change as has so far occurred can be suppressed.

Also, as the specific gravity of water supplied into the fuel system is larger than that of the liquid fuel remaining in the fuel system, the remaining liquid fuel is replaced with water easily and occurrence of coking due to the liquid fuel remaining and being exposed to a high temperature becomes less frequent, thereby occurrence of blockage of the fuel passages in the fuel system can be prevented.

The present invention mentioned in claim 2 provides following method;

A combustor ignition method of a gas turbine combustion system, ignition of fuel therein being done by an ignition plug constructed to be protrusile and retractile into and from within a combustor wall by effect of an air pressure acting on a piston provided to a back side of said ignition plug and an activating force resisting thereagainst, characterized in comprising steps of; setting a stroke length of a protrusion stroke of said ignition plug so that an optimal position for ignition of a gas fuel and an optimal position for ignition of a liquid fuel fall within said protrusion stroke; and while an ignition spark is kept discharged from a tip of said ignition plug, protruding said ignition plug into within the combustor wall to a position of said stroke length at a slow speed so that an ignition time during which ignition is possible may be ensured at said respective optimal positions for ignition.

Further, the present invention mentioned in claim 3 provides following means for an effective use of the invention of claim 2;

A gas turbine combustion system comprising a combustor having therein an ignition plug constructed to be protrusile and retractile into and from within a combustor wall by effect of an air pressure acting on a piston provided to a back side of said ignition plug and an activating force resisting thereagainst, characterized in that said ignition plug is provided with a control means interposed in an air system from an air source to an air pressure receiving space of said piston for controlling an air supply rate to said air pressure receiving space of the piston so that a protrusion rate of said ignition plug into within the combustor wall is controllable by said control means.

Also, the present invention mentioned in claim 4 provides following means;

A diffusion combustion type gas turbine combustion system, characterized in that an exhaust passage for discharging exhaust gas from a gas turbine and a fuel passage for supplying fuel into a combustor are connected so as to communicate with each other by a recirculation passage for recirculating the exhaust gas and an exhaust gas compressor is provided in said recirculation passage.

That is, according to the present invention, the exhaust passage for discharging the exhaust gas and the fuel passage for supplying the fuel are connected so as to communicate with each other by the recirculation passage and the exhaust gas compressor is provided in the recirculation passage, thereby the exhaust gas from the gas turbine is mixed into the fuel and the high calorie fuel is reformed into the low calorie fuel so that the flame temperature in the combustion is reduced, hence a diffusion combustion type gas turbine of low NOx concentration can be obtained.

DESCRIPTION OF THE PREFERRED EMBODIMENTS

Figure 5:
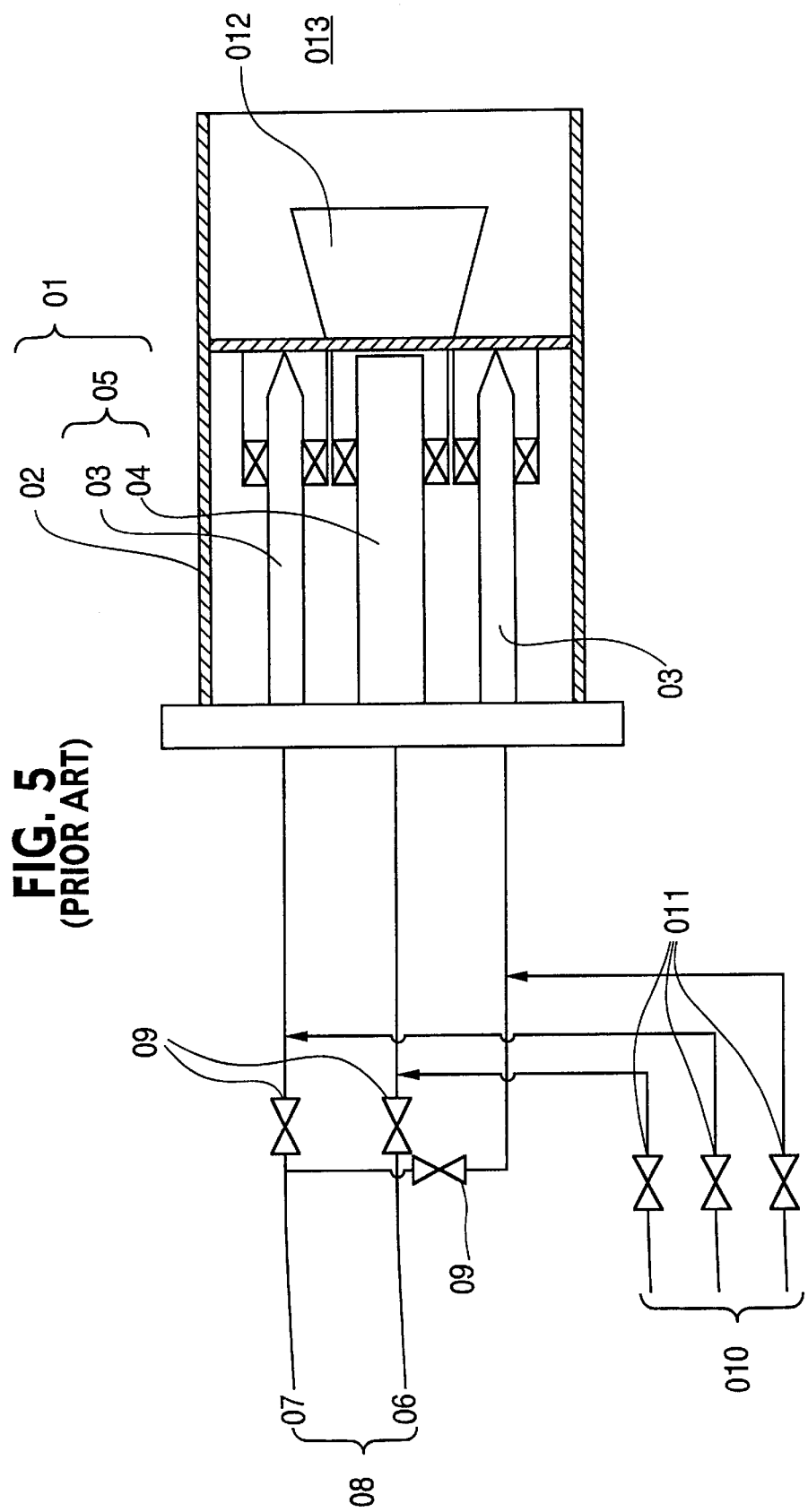
FIG. 5 is a schematic view of a prior art liquid fuel purge device.

Herebelow, a liquid fuel purge device of one embodiment according to the present invention will be described with reference to FIG. 1. It is to be noted that parts of the device of FIG. 1 which are same as or similar to those of the prior art device shown in FIG. 5 are given same reference numerals with description thereon being omitted.

Figure 1:
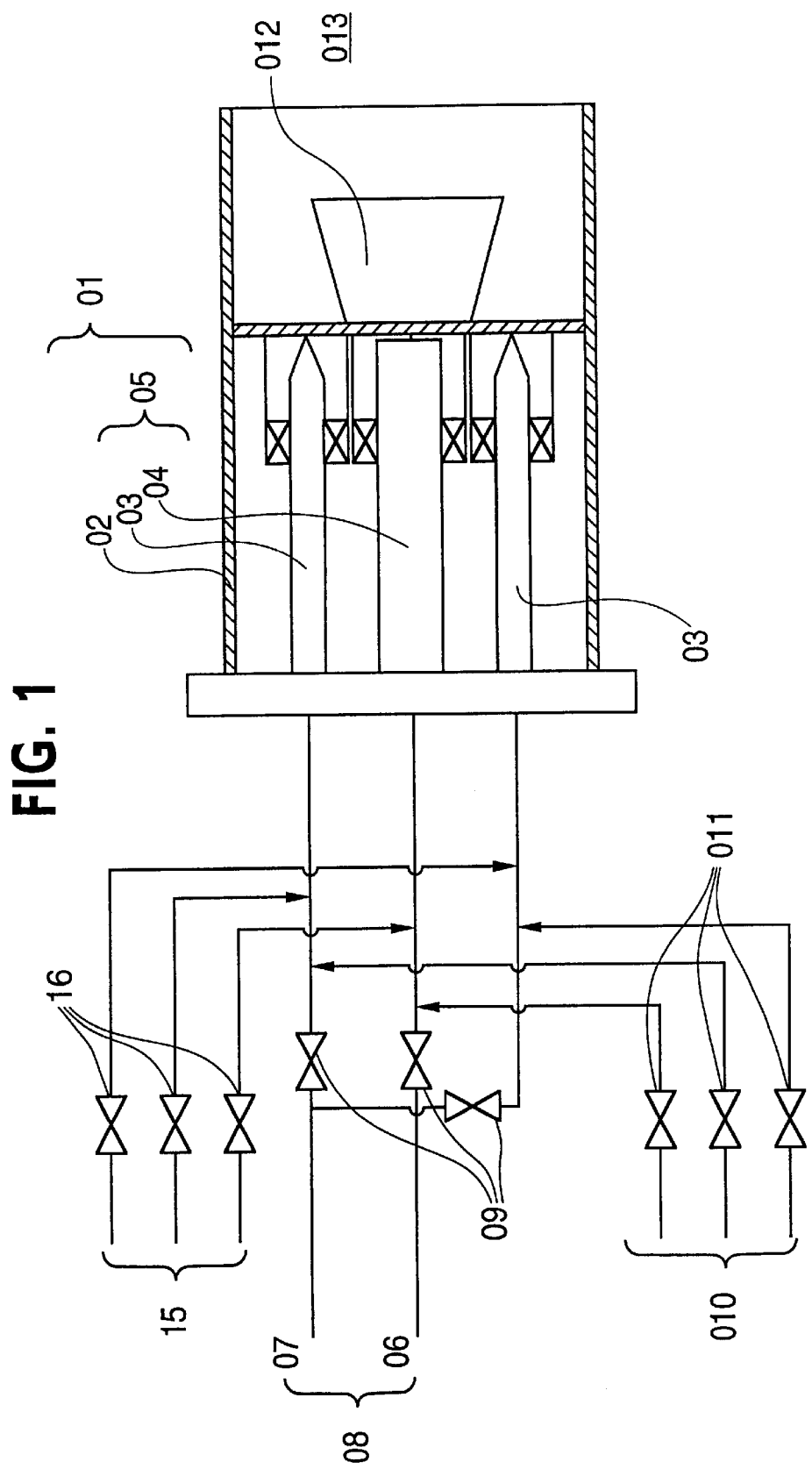
FIG. 1 is a schematic view of a liquid fuel purge device of an embodiment according to the present invention.

In the present embodiment shown in FIG. 1, in order to purge the liquid fuel remaining in the liquid fuel system 08, consisting of the pilot liquid fuel system 06 and the main liquid fuel system 07, and the fuel nozzle 05, there is provided a water purge system 15 for injecting water into the liquid fuel system 08 with a predetermined pressure so that the purging of the liquid fuel is done by water supplied from the water purge system 15.

That is, the water purge system 15 is connected at its one end to each of the liquid fuel system 08, that is, to each of the pilot liquid fuel system 06 and the main liquid fuel system 07, between the stop valve 09 and the fuel nozzle 05 and a stop valve 16 is interposed in the water purge system 15. Thus, when the stop valve 16 is opened, water supplied from outside is injected vigorously from the water purge system 15 into the liquid fuel system 08.

Also, in the present embodiment, there is provided the prior art air purge system 010 for purging the liquid fuel remaining in the fuel system, including the liquid fuel system 08 and the fuel nozzle 05, into the combustion chamber 013 via the fuel nozzle 05. This is for the purpose of ensuring a sweeping of the fuel system after the water purge by the water purge system 15 has been done. It is to be noted that the liquid fuel remaining in the fuel system may also be purged by water injected from the air purge system 010 into the liquid fuel system 08 if the air purge system 010 is so supplied with water, wherein the water purge system 15 having the stop valve 16 may not be necessarily provided.

In the liquid fuel purge device of the present embodiment, compressed air in the prior art air purge system 08 is not used but water injected from the water purge system 15 is used for purging the liquid fuel remaining in the pilot liquid fuel system 06 and the main liquid fuel system 07 as well as in the pilot nozzle 04 and the main nozzle 03.

By so using the water for purging the remaining liquid fuel, the remaining liquid fuel is prevented from being discharged suddenly as it is into the combustion chamber 013, thereby it becomes possible to suppress a large load change. Also, as the specific gravity of water used for the purging is larger than that of the liquid fuel to be purged, the remaining liquid fuel is easily replaced by the water, thereby occurrence of coking as well as blockage of the fuel passages in the fuel system becomes less frequent, hence a stable operation of the gas turbine becomes possible.

As mentioned above, in the liquid fuel purge device of the present embodiment, when the supply of liquid fuel into the fuel nozzle has been stopped, water is supplied into the fuel system so that the liquid fuel remaining therein is purged by the water so supplied to be discharged into the combustion chamber via the fuel nozzle, thereby the liquid fuel is prevented from remaining in the fuel system including the liquid fuel system and the fuel nozzle.

Further, even if the remaining liquid fuel is discharged suddenly into the combustion chamber from the fuel nozzle at the time of purging, the liquid fuel so discharged is diluted by the water, thereby such a large load change as has occurred in the prior art case due to sudden burning of the liquid fuel so discharged into the combustion chamber via the fuel nozzle is suppressed.

Also, the remaining liquid fuel is easily replaced with the water supplied, thereby occurrence of coking of the liquid fuel remaining and being exposed to a surrounding high temperature becomes less frequent, occurrence of blockage of the fuel system is prevented and a stable operation of gas turbine becomes possible.

Figure 2:
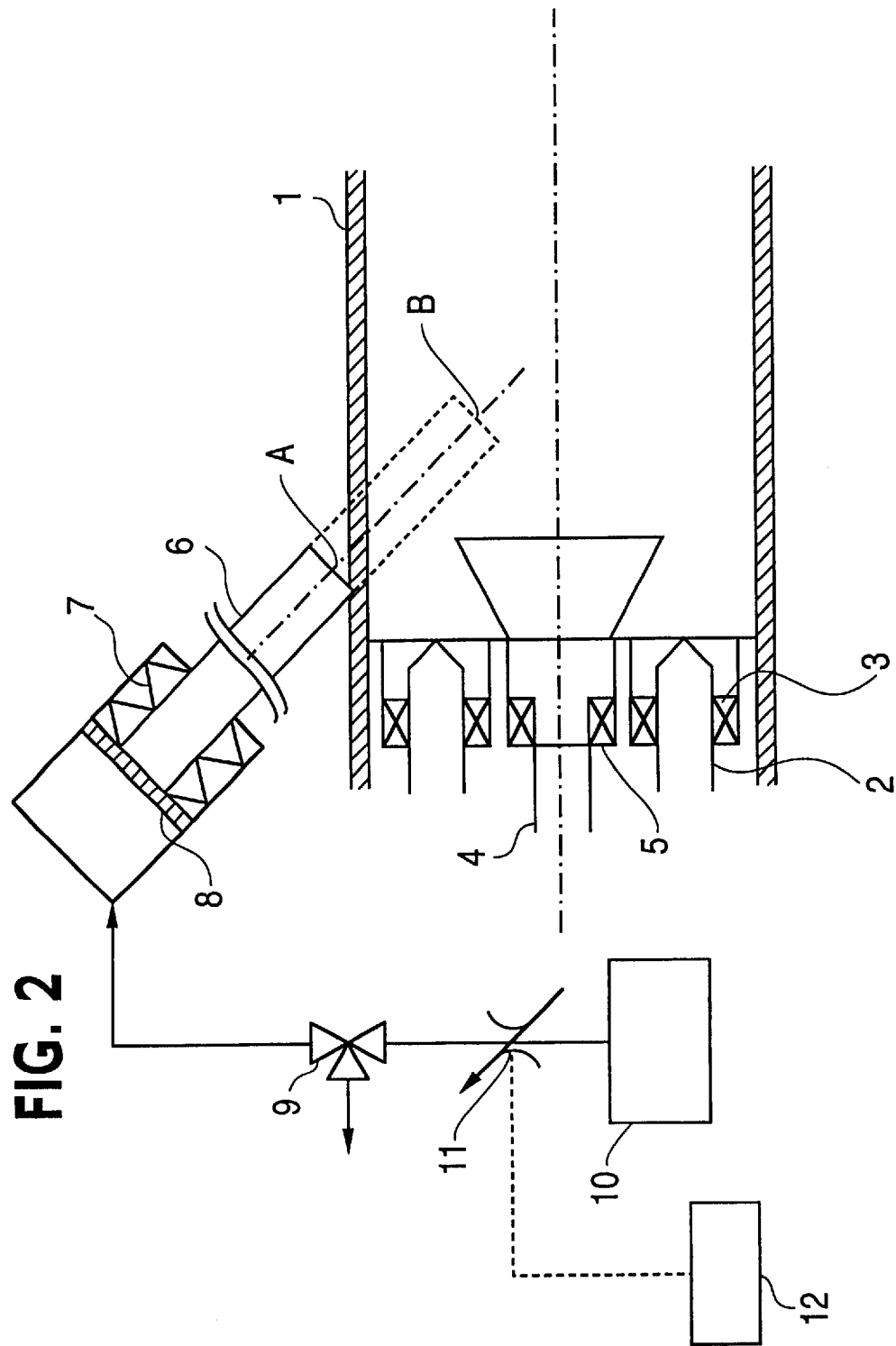
FIG. 2 is a schematic view of a combustor including an ignition plug unit of an embodiment according to the present invention.
Figure 3:
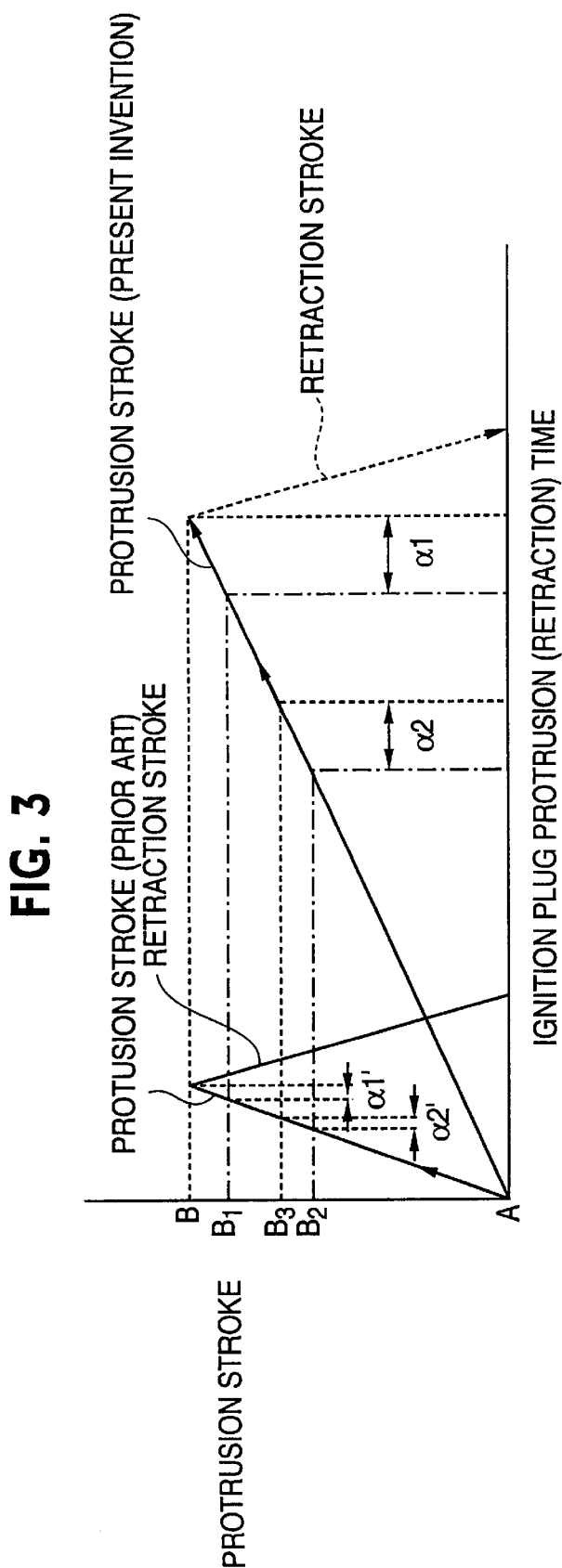
FIG. 3 is a view for comparing an ignition plug in the prior art and that of the present invention, wherein a protrusion stroke of the ignition plug is so set that an optimal position $B_2$ to $B_3$ for ignition of liquid fuel and that $B_1$ to B for ignition of gas fuel fall in the protrusion stroke.
Figure 6:
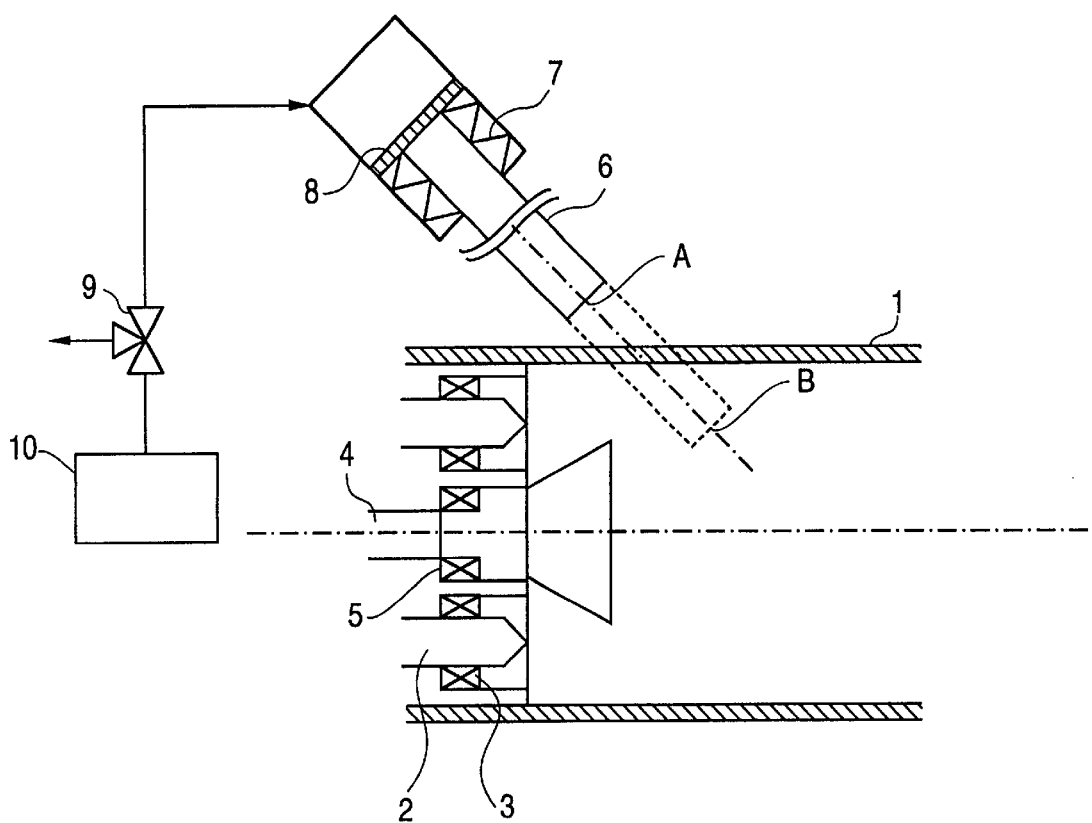
FIG. 6 is a schematic view of a combustor including a prior art ignition plug unit.

In the embodiment described in FIG. 1, like relationship between the combustor of FIG. 5 and the ignition plug unit of FIG. 6, an ignition plug unit of an embodiment according to the present invention may be incorporated into the combustor described in FIG. 1, said ignition plug unit according to the present invention being shown schematically in FIG. 2 and described in detail of its function in FIG. 3.

Said embodiment of FIGS. 2 and 3 will be described concretely below. It is to be noted, however, that the present invention is not intended to be limited to the dimensions, shapes, arrangements, etc. of construction parts shown in the embodiments, unless otherwise mentioned, but embraces such modified forms thereof as come within the scope of the claims.

FIG. 2 is a schematic view of a combustor including the ignition plug unit of the embodiment according to the present invention. Same parts as those of the prior art shown in FIG. 6 are given same reference numerals and detailed description thereon will be omitted. In the ignition plug unit shown in FIG. 2, like in the mentioned prior art, there is provided the piston 8 on the back side of the ignition plug 6 and the piston 8 is protrusile and retractile into and from within the combustor wall 1 by air pressure acting on the piston 8 and elastic force of the elastic spring 7 resisting thereagainst so that it is protruded within the combustor wall 1 only when the ignition is to be done.

As a feature of the present embodiment, there are provided a speed control valve 11 between the air source 10 and the three way valve 9 for controlling air supply rate to the piston 8 for driving the ignition plug 6 and an opening controller 12 for controlling valve opening of the speed control valve 11 so that protrusion speed of the ignition plug 6 protruded to the position B may be controlled.

In the ignition plug unit of the present embodiment, the ignition plug 6 is controlled of the protrusion speed so that it is protruded slowly. While the ignition plug 6 is being protruded from position A to position B, the ignition spark is kept discharged from the ignition plug tip.

Thus, if a protrusion stroke from position A to position B is so set that an optimal position for ignition of gas fuel and an optimal position for ignition of oil fuel may fall between position A and position B, then the ignition plug is protruded slowly into within the combustor wall 1 while the ignition spark is kept discharged from the ignition plug tip, thereby when the ignition plug 6 comes to the respective optimal positions, an ignition time during which the ignition is possible can be ensured. After the ignition has been done, like in the prior art case, the air which had been supplied to the piston 8 from the three way valve 9 is drawn by changeover of the three way valve 9 and the ignition plug 6 is retracted quickly to the original position A from within the combustor wall 1 by the elastic force of the spring 7.

The above-mentioned action will be described with reference to FIG. 3. When, for example, the protrusion stroke from position A to position B is so set that the optimal position for ignition of oil fuel falls between $B_2$ and $B_3$ and the optimal position for ignition of gas fuel falls between $B_1$ and B, if the ignition plug 6 is protruded quickly like in the prior art case even if the ignition spark is kept discharged from the ignition plug tip, the passing time $\alpha_2'$ between the optimal position $B_2$ to $B_3$ for ignition of oil fuel and the passing time $\alpha_1'$ between the optimal position $B_1$ to B for ignition of gas fuel, respectively, are extremely short time so that the ignition time during which the ignition is possible cannot be ensured.

On the other hand, in the present embodiment, the ignition plug 6 is protruded slowly so that the passing time $\alpha_2$ between the optimal position $B_2$ to $B_3$ for ignition of oil fuel and the passing time $\alpha_1$ between the optimal position $B_1$ to B for ignition of gas fuel may ensure the ignition time during which the ignition is possible, hence in the dual fuel type combustor in which both gas and oil fuels are usable, a secure ignition can be done for either of the fuels.

After the ignition has been done, like in the prior art case, the air which had been supplied to the piston 8 from the three way valve 9 is drawn by the three way valve 9 being changed over, thereby the ignition plug 6 is retracted quickly to the original position A from within the combustor wall 1 by the elastic force of the spring 7. The time for this retraction stroke is same as that in the prior art case.

Thus, according to the present embodiment, the protrusion speed of the ignition plug is controlled to be slow so that the ignition time during which the ignition is possible may be ensured and at the same time, the ignition spark is kept discharged during the protrusion stroke, thereby in the dual fuel type combustor in which both gas and oil fuels are usable, a secure ignition can be done for either of the fuels.

As mentioned above, according to the present invention, said air supply rate is so controlled that the protrusion speed of the ignition plug into within the combustor wall is slow and the protrusion stroke thereof is so set that the optimal position for ignition of gas fuel and the optimal position for ignition of oil fuel fall within the protrusion stroke from the protrusion start position A to the protrusion finish position B, thereby the ignition plug is protruded slowly into within the combustor wall while the ignition spark is kept discharged from the ignition plug tip, and when the ignition plug comes to the optimal position of the respective kinds of fuels, the ignition time during which the ignition is possible can be ensured, which results in obtaining a gas turbine combustor ignition plug unit which is able to set the ignition plug tip to the position which is optimal for ignition, even in the case of a dual fuel type combustor in which both gas and oil fuels are usable.

Figure 4:
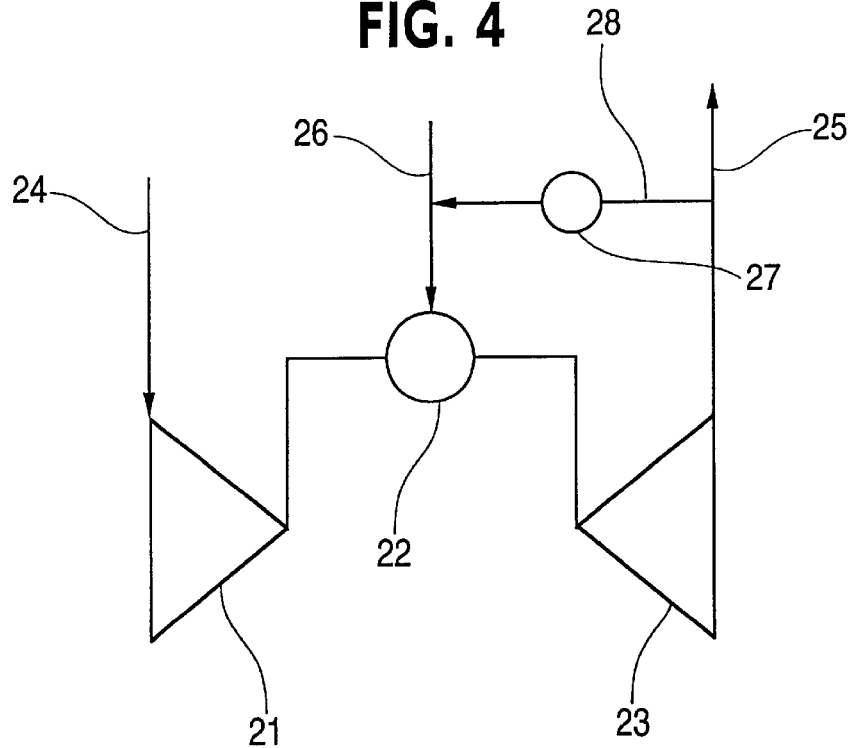
FIG. 4 is an explanatory view of a diffusion combustion type gas turbine of an embodiment according to the present invention.
Figure 7:
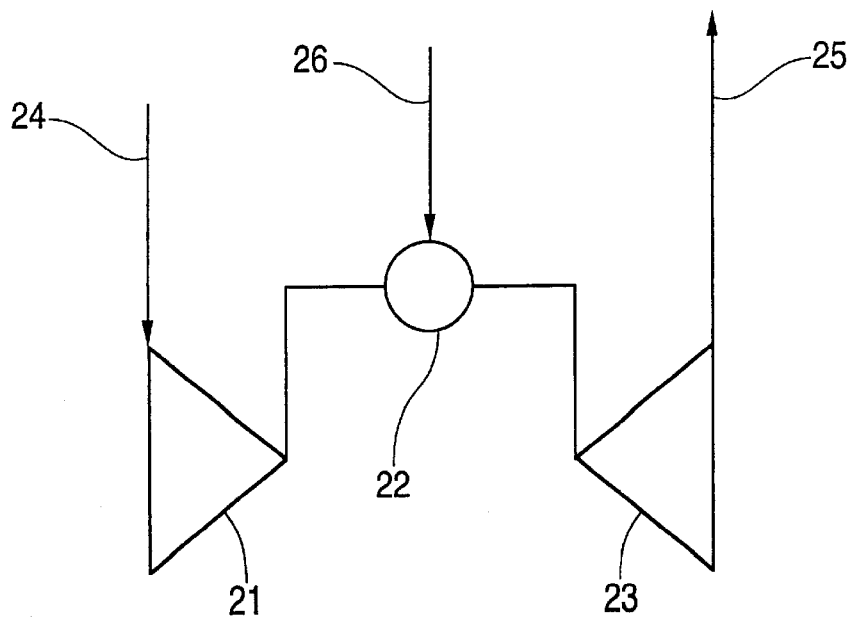
FIG. 7 is an explanatory view of a prior art diffusion combustion type gas turbine.

Also, the embodiment described in FIG. 1, like the prior art described in FIG. 7, may be incorporated in an entire system of a diffusion combustion type gas turbine shown in FIG. 4. In FIG. 7, same parts as those in the prior art described in FIG. 7 are given same reference numerals with repeated description being omitted and featured portion of the present embodiment will be mainly described.

That is, in the present embodiment, while not only the basic arrangement of compressor 21, combustor 22 and turbine 23 but also the basic construction of combustor 22 are of the diffusion combustion type which is same as the prior art and as a featured construction, there are provided a recirculation passage 28 connecting in mutual communication the exhaust passage 25 of the turbine 23 and the fuel passage 26 for supplying fuel into the combustor 22 and an exhaust gas compressor 27 in the recirculation passage 28.

In other words, the present embodiment is constructed such that the recirculation passage 28 is provided so that the exhaust passage 25 and the fuel passage 26 communicate with each other and the exhaust gas compressor 27 is provided in the recirculation passage 28 so that the exhaust gas which has done a predetermined work at the turbine 23 is pressure-elevated and then added into the fuel.

In the present embodiment so constructed, operation thereof is done such that upon starting of the system, the combustor 22 is ignited and combustion gas increases gradually to be supplied into the turbine 23 for speed up thereof. This process is ordinary one which is same as the prior art.

Then, in the present embodiment, when load increases in a steady operation and generated NOx concentration becomes high, the exhaust gas compressor 27 is started so that exhaust gas of low $O_2$ concentration is mixed into the fuel in the fuel passage 26 via the recirculation passage 28.

That is, the exhaust gas is mixed into the high calorie fuel, thereby this high calorie fuel becomes a low calorie fuel with result that the flame temperature in the combustion is reduced and generated NOx concentration becomes lower. Thus, the fuel in the fuel passage 26 is mixed with the exhaust gas of low $O_2$ concentration via the recirculation passage 28 to be reformed into the low calorie fuel, hence the flame temperature is reduced and the generated NOx concentration is suppressed to a lower level.

Moreover, the construction is simple such that the exhaust passage 25 and the fuel passage 26 are connected by the recirculation passage 28 to communicate with each other and the exhaust gas compressor 27 is provided in the recirculation passage 28, hence as compared with the usual premixing type, the combustor can be made in a simple structure and the manufacturing cost also is less expensive.

It is to be noted that, needless to mention in the case where the fuel supplied through the fuel passage 26 is a gas fuel, even in the case where the fuel is an atomized liquid fuel, it can be reformed into a low calorie fuel like in the case of gas fuel.

According to the present invention, as mentioned above, the diffusion combustion type gas turbine is constructed such that the exhaust passage for discharging the exhaust gas from the gas turbine and the fuel passage for supplying fuel into the combustor are connected so as to communicate with each other by the recirculation passage and the exhaust gas compressor is provided in the recirculation passage, thereby the gas turbine exhaust gas is mixed into the fuel in the fuel passage by the exhaust gas compressor, the high calorie fuel is reformed into the low calorie fuel and the flame temperature in the combustion is reduced, hence a diffusion type gas turbine of low NOx concentration can be obtained.

Moreover, said diffusion type gas turbine can be obtained with such a comparatively simple construction that the prior art diffusion type gas turbine is added with the recirculation passage and the exhaust gas compressor, hence while the original advantage of the diffusion combustion type gas turbine that the designing and manufacturing cost is low is maintained as it is, the low NOx combustion can be attained.

What is claimed is:

1. A gas turbine combustion system comprising:
    a fuel system including a fuel nozzle and a liquid fuel system; and
    a liquid fuel purge device, connected to said liquid fuel system, for purging liquid fuel remaining in said fuel system into a combustion chamber by supplying liquid water into said fuel system,
    wherein said liquid fuel purge device is adapted to purge said fuel system when a liquid fuel operated gas turbine is stopped or when the liquid fuel is changed over to a gas fuel.

2. A gas turbine combustion system as claimed in claim 1, further comprising an air purge system connected to said liquid fuel system for purging said fuel system after it has been purged with water.

3. A gas turbine combustion system as claimed in claim 1, wherein said fuel system further comprises means for controlling a flow of liquid fuel to said fuel nozzle, said liquid fuel purge device being connected to said fuel system between said means for controlling a flow of liquid fuel and said fuel nozzle.

4. An ignition method for a gas turbine combustion system, said method comprising:
    setting a stroke length of a protrusion stroke of an ignition plug so that an optimal position for ignition of a gas fuel and an optimal position for ignition of a liquid fuel fall within the protrusion stroke, wherein the ignition plug is protrusible and retractable through a combustor wall; and
    protruding the ignition plug, at a slow speed while discharging an ignition spark from a tip of the ignition plug, into a combustion chamber defined by the combustor wall to a position of the set stroke length so that an ignition time, during which ignition is possible for the liquid or gas fuel, is ensured at the optimal positions for ignition,
    wherein the ignition plug is protruded by applying air pressure to a piston provided on a back side of the ignition plug.

5. An ignition method as claimed in claim 4, further comprising retracting the ignition plug from the combustion chamber after protruding the ignition plug by the set protrusion stroke.

6. A gas turbine combustion system comprising:
    a combustor having a combustor wall defining a combustion chamber;
    an ignition plug capable of protruding into and retracting from said combustion chamber;
    a piston provided on a back side of said ignition plug, wherein said ignition plug can be protruded into said combustion chamber by applying air pressure to said piston;
    an air system including a control means for controlling a rate of air supplied from an air source to an air pressure receiving space of said piston, wherein a protrusion rate of said ignition plug into said combustion chamber is controllable by said control means; and
    a resisting force applying device for applying a force that opposes movement of said ignition plug in a protruding direction.

7. A gas turbine combustion system as claimed in claim 6, wherein said resisting force applying device comprises a spring.

8. A diffusion combustion type gas turbine combustion system comprising:
    a combustor having an upstream side and a downstream side;
    a gas turbine connected to the downstream side of said combustor;
    an exhaust passage for discharging exhaust gas from said gas turbine;
    a fuel passage connected to the upstream side of said combustor;
    a recirculation passage communicating with said exhaust gas passage and said fuel passage; and
    an exhaust gas compressor provided in said recirculation passage, wherein said recirculation passage is adapted to permit exhaust gas, from said exhaust gas passage, to flow directly into said fuel passage after being compressed by said exhaust gas compressor.

9. A diffusion combustion type gas turbine combustion system as claimed in claim 8, further comprising a compressor disposed upstream of said combustor.

* * * * *